April 29, 1958  J. FOLK  2,832,388
SLICING MACHINE HAVING AUTOMATICALLY REVERSIBLE PUSHER
Filed Jan. 21, 1954  5 Sheets-Sheet 1

*INVENTOR:*
JOSEPH, FOLK
BY
Marshall, Johnston, Cook & Root.
ATT'YS

April 29, 1958  J. FOLK  2,832,388
SLICING MACHINE HAVING AUTOMATICALLY REVERSIBLE PUSHER
Filed Jan. 21, 1954  5 Sheets-Sheet 2
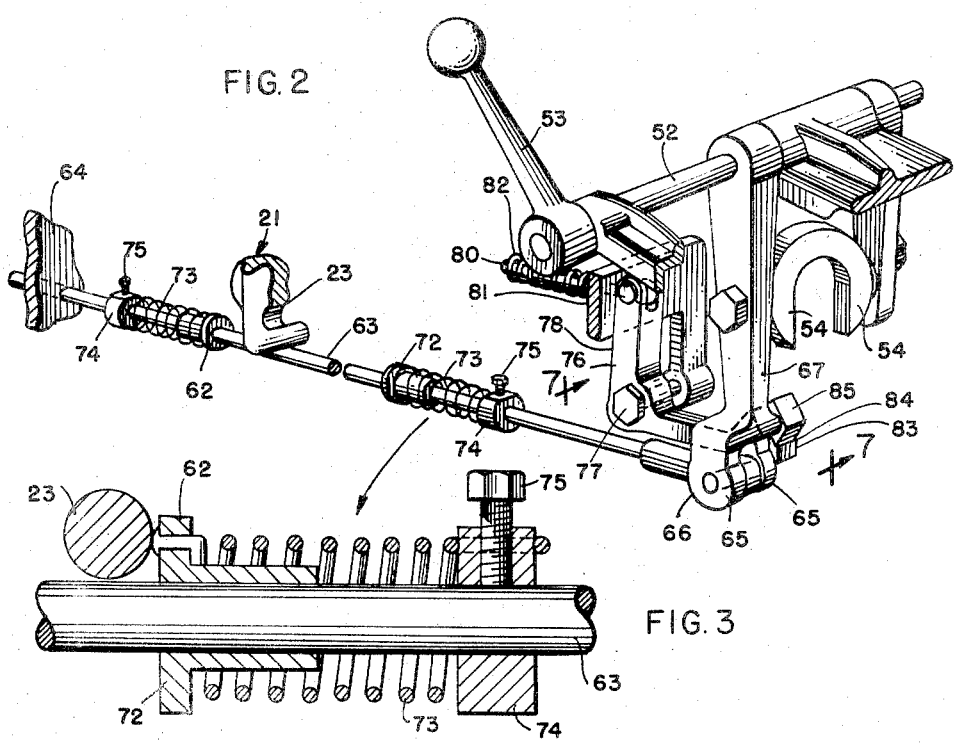
FIG. 2
FIG. 3
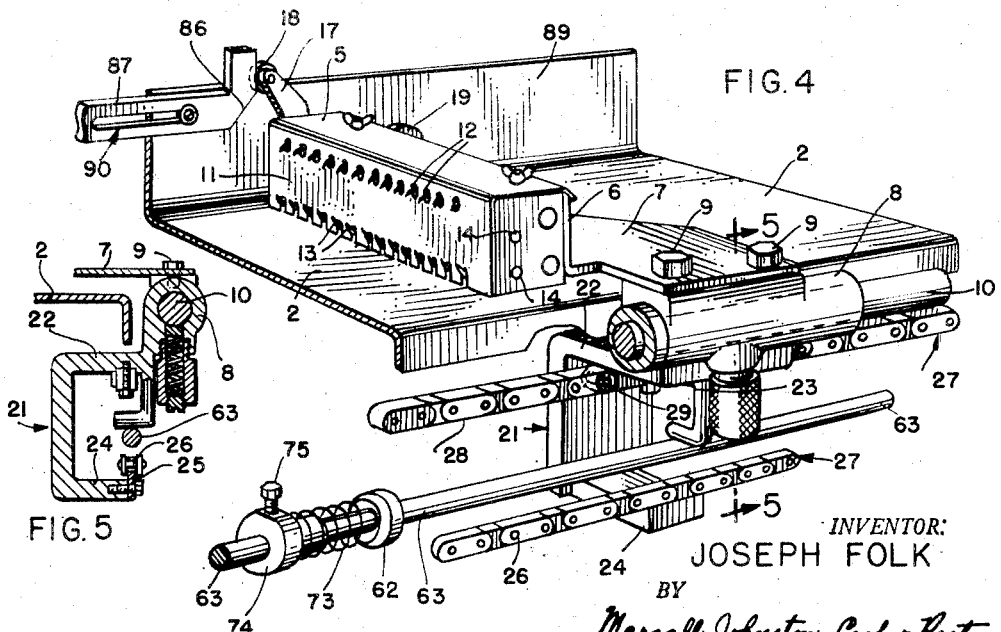
FIG. 4
FIG. 5
INVENTOR:
JOSEPH FOLK
BY
Margall, Johnston, Cook & Root,
ATT'YS April 29, 1958        J. FOLK        2,832,388
SLICING MACHINE HAVING AUTOMATICALLY REVERSIBLE PUSHER
Filed Jan. 21, 1954        5 Sheets-Sheet 3
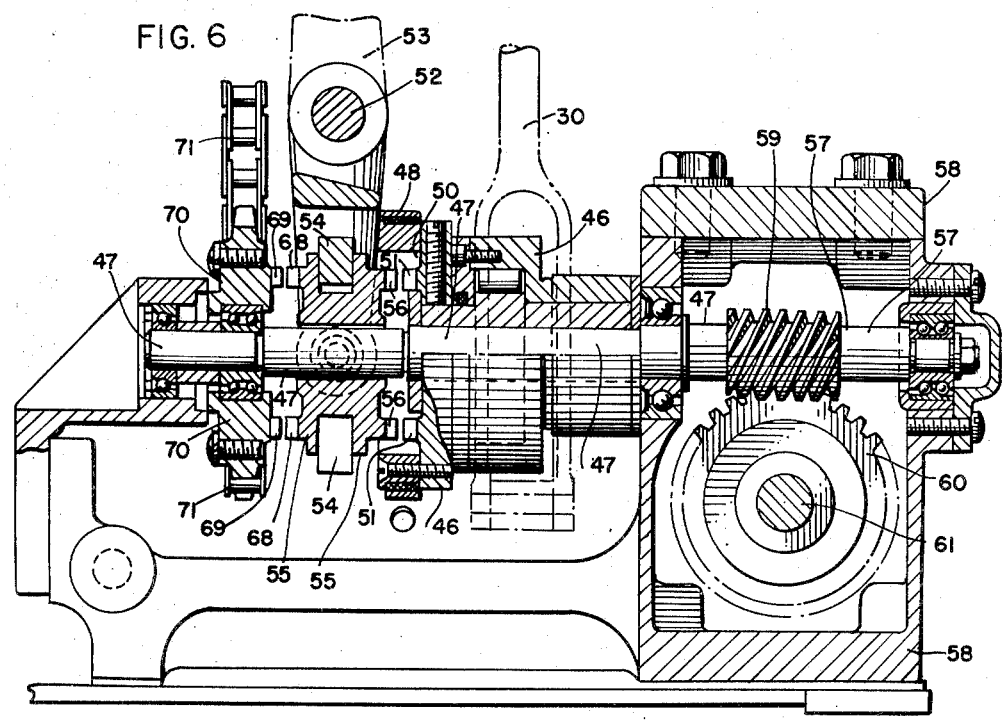
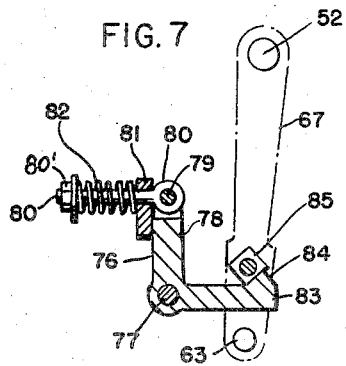
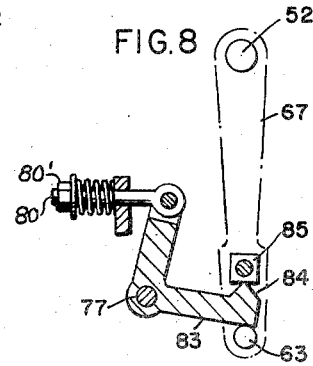
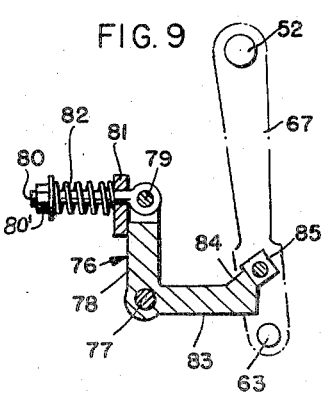
INVENTOR:
JOSEPH FOLK
BY
ATT'YS April 29, 1958 J. FOLK 2,832,388
SLICING MACHINE HAVING AUTOMATICALLY REVERSIBLE PUSHER
Filed Jan. 21, 1954 5 Sheets-Sheet 4
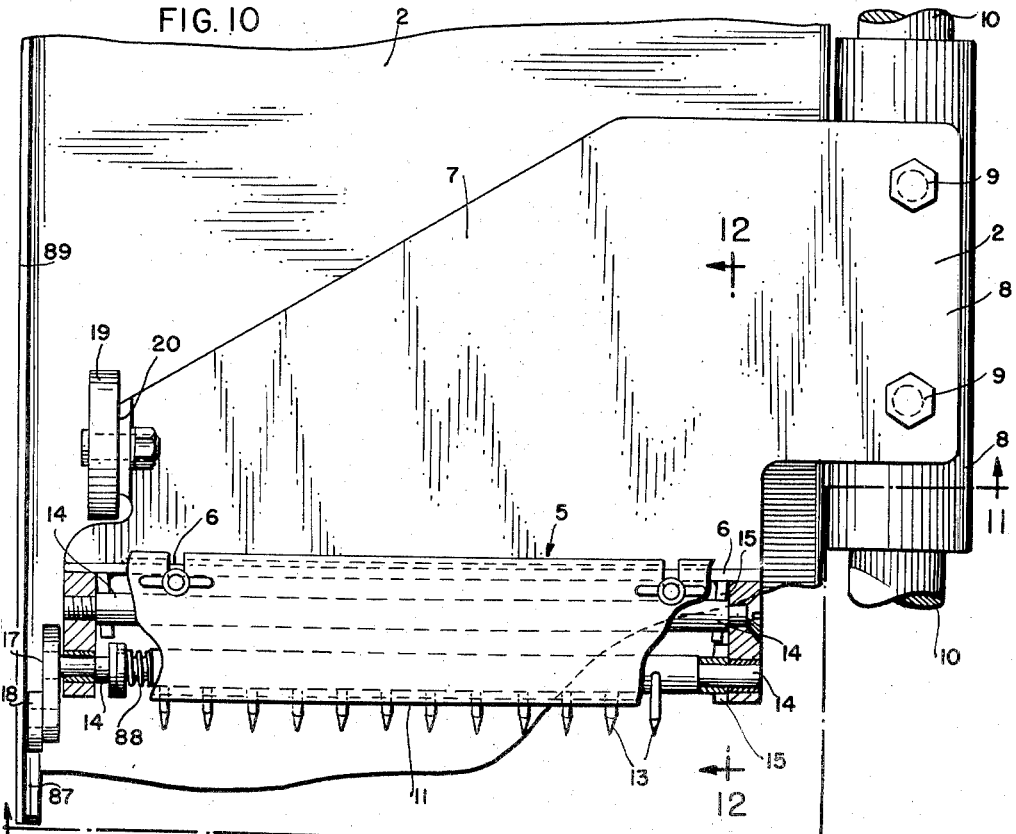
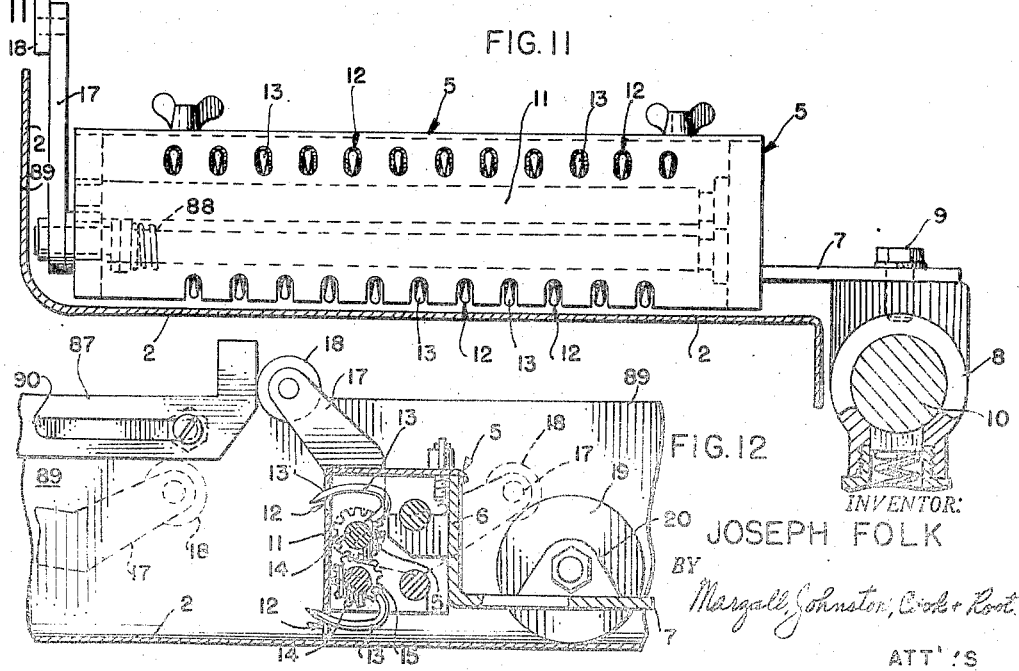
INVENTOR:
JOSEPH FOLK
BY
Margall, Johnston, Cook + Root
ATT'YS April 29, 1958   J. FOLK   2,832,388
SLICING MACHINE HAVING AUTOMATICALLY REVERSIBLE PUSHER
Filed Jan. 21, 1954   5 Sheets-Sheet 5
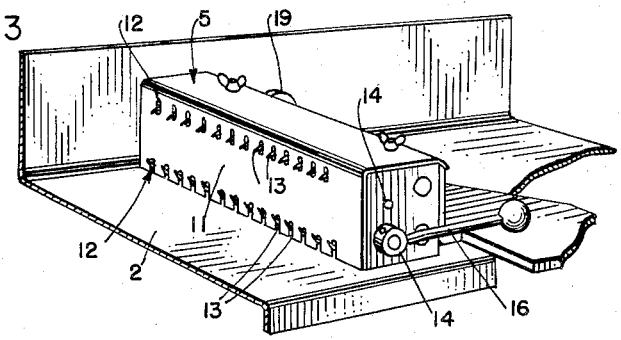
FIG. 13
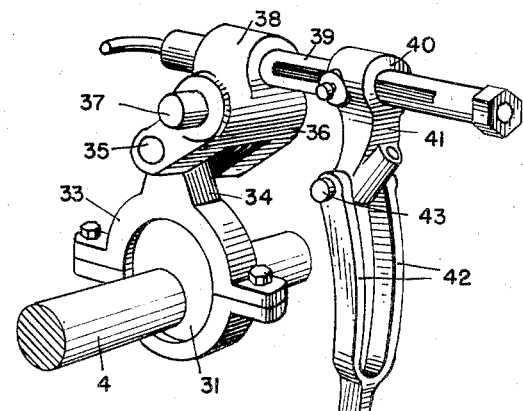
FIG. 14
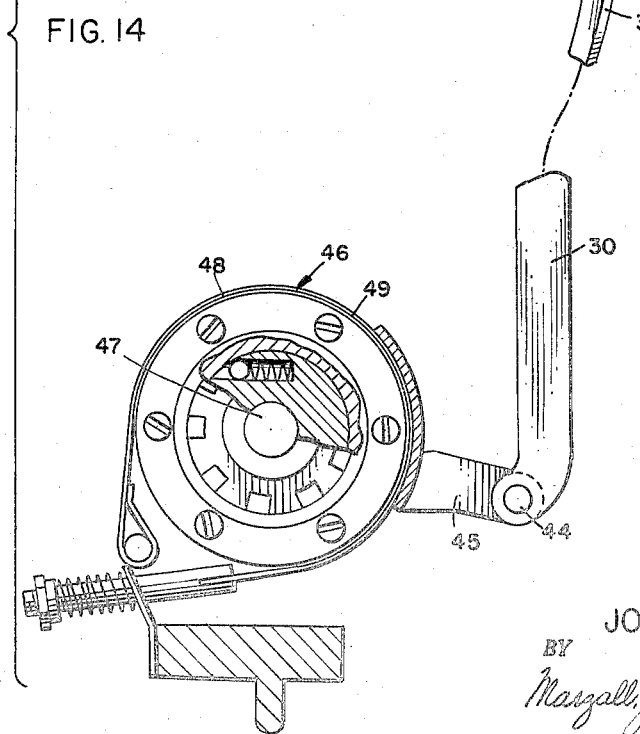
INVENTOR:
JOSEPH FOLK
BY
Mazgall, Johnston, Cook & Root.
ATT'YS United States Patent Office 2,832,388
Patented Apr. 29, 1958

2,832,388

SLICING MACHINE HAVING AUTOMATICALLY REVERSIBLE PUSHER

Joseph Folk, La Porte, Ind., assignor to U. S. Slicing Machine Company, Inc., La Porte, Ind., a corporation of Indiana Application January 21, 1954, Serial No. 405,418

4 Claims. (Cl. 146—95)

This invention relates to slicing machines in general and particularly that class of slicing machine which embodies a food pusher for feeding substance to a slicing knife and then having the slices arranged in overlapping relationship or shingle fashion on a conveyer arranged adjacent to the cutting knife.

The broad adaptation of the present invention consists of feeding a food pusher or substance gripper along a substance table in rapid, intermittent, step-by-step arrangement, and at the conclusion of the substance feeding will return the pusher or gripper to its original position rapidly to again commence another cycle.

The primary object of the present invention is the provision of new and novel means for automatically pushing a substance gripper along a food table in rapid, step-by-step relation, projecting the impaling prongs of the gripper at the beginning of the feeding operation, and then automatically returning the gripper to the original place of beginning, and receding the prongs at the end of such return position.

Another object of the invention is the provision of new and improved means for effecting the automatic translation of a food gripper in step-by-step movement along a food table, automatically engaging the impaling teeth of the gripper when the substance is moved toward feeding position, returning the gripper rapidly to the original point of beginning and releasing the impaling prongs at the end of the gripper return, and then again causing the gripper to impale the substance and again feed toward slicing position.

A further object of the invention consists in the provision of new and improved means for intermittently feeding a substance to cutting position in timed relationship with respect to the cutting cycle of a slicing knife in cooperation with a substance gripper to feed slices to the cutting knife and then returning the gripper rapidly from feeding position to reverse position.

A still further object of the invention resides in the provision of the location and arrangement of parts for automatically effecting step-by-step movement of a gripper element to advance the substance to be cut to slicing position and then automatically returning the gripper at a rapid rate of speed to original position for having another piece of substance placed on the food table and then advanced to feeding position.

Numerous other objects and advantages will be apparent throughout the progress of the specification which follows.

The accompanying drawings illustrate a selected embodiment of the invention and the views therein are as follows:

Fig. 2 is an enlarged detail fragmentary view showing several of the parts in perspective for controlling the forward feeding of the food pusher or gripper and for automatically causing the return movement of the pusher or gripper;

Fig. 3 is a further enlarged detail sectional view showing various parts constituting stop-controlled mechanism for causing forward feeding or reverse return of the food gripper or pusher;

Fig. 4 is a detail perspective view showing the manner in which the food gripper is mounted, and the manner in which the food gripper is moved to feeding position and then returned automatically at a rapid rate;

Fig. 5 is a detail transverse sectional view on the lines 5—5 of Figs. 1 and 4;

Fig. 6 is an enlarged detail sectional view showing the manner in which the gripper feed chain is operated, the means for effecting the shifting of the clutch and the means for driving an oscillating member for effecting the feeding movement of the gripper;

Fig. 7 is a detail sectional view on the line 7—7 of Fig. 2 showing some of the mechanism in its locked position to effect forward feeding of the pusher or gripper;

Fig. 8 is a view similar to Fig. 7 showing the parts in neutral or non-operative position;

Fig. 9 is a view similar to Figs. 7 and 8, but showing the parts in the position they attain during reverse feed movement;

Fig. 10 is an enlarged detail plan view showing the manner in which the gripper is mounted on the food table and the parts for effecting reverse rapid return of the gripper, certain parts being broken away for the sake of clearness;

Fig. 11 is a detail elevation along the feed table looking in the direction of the arrows 11—11 of Fig. 10;

Fig. 12 is a detail transverse sectional view on the line 12—12 of Fig. 10;

Fig. 13 is a detail perspective view of the substance gripper mounted on the feed table with manual means for operating the impaling prongs; and Fig. 14 is an enlarged detail exploded perspective view showing the manner in which the clutch member drives the feed drive and reversing shaft from the knife drive shaft.

Figure 1:
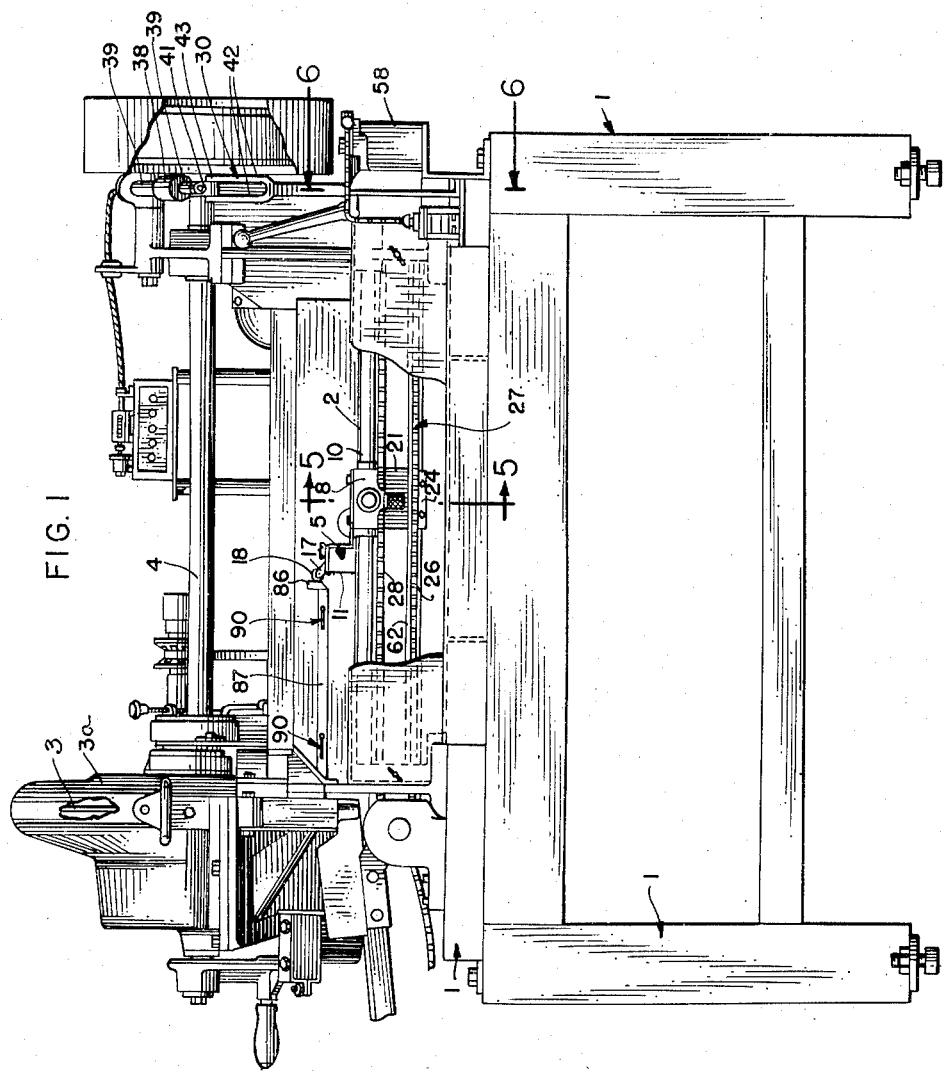
Fig. 1 is a detail side elevational view with a section broken away of a bacon slicing machine with which the invention is embodied.

The construction herein shown for the purpose of illustrating the invention shows the parts associated with a bacon slicing machine of the type manufactured by the U. S. Slicing Machine Company, Inc. of La Porte, Indiana.

The slicing machine comprises a suitable supporting frame 1 upon which the various elements are mounted and supports a feed table 2 upon which substance is to be fed in step-by-step relationship toward a feeding or slicing position which may include a slicing knife 3 arranged within a housing 3a to have slices cut from the substance. The slicing knife is driven by a knife shaft 4 which is revolubly mounted in suitable bearings. The shaft 4 is driven by an electric motor (not shown) at a high rate of speed.

Substance is fed along the top of the feed table 2 by means of a pusher which, in the present instance, includes gripper 5. The gripper 5 is mounted on an upstanding arm 6 which is part of an integral horizontal plate 7, Figs. 10–12. Plate 7 is connected to a sleeve 8 by means of fastening screws 9, Fig. 4. The sleeve 8 is mounted on a longitudinal rod 10 which has its ends connected to, and supported by, rigid parts of the frame structure 1. The gripper 5 includes a casing 11 having openings 12, 12, Fig. 4, provided in its front face and through which upper and lower impaling prongs 13 extend to impale and secure a piece of substance on the feed table top 2. The impaling prongs 13, 13 are fastened to transverse shafts 14, 14 which carry the meshing gears 15, 15, Fig. 12, whereby rotation of a shaft 14 will cause the impaling prongs 13 to either extend outwardly of the casing 11 for impaling purposes or to cause the impaling prongs to recede and be received totally within the casing 11 to release the substance, particularly end pieces thereof. Both shafts 14 may be rotated for projecting or receiving the prongs 13 and a shaft 14 may be rotated manually by an outwardly positioned handle 16 (Fig. 13), or the impaling prongs may be operated by either of the shafts 14 automatically by a lever arm 17 which revolubly supports an abutting roller 18, Fig. 12.

The gripper 5 is supported on one side by the connection of the plate 7 to the sleeve 8 and on its other side by a roller 19 which is rotatably mounted on an upstanding plate 20 integral with the plate 7, Fig. 10.

The sleeve or boss 8 has rigidly connected thereto a channel-shaped member 21 having a horizontally extending part 22 which is arranged below the table top 2. The horizontal part 22 has an integral arm 23 projecting downwardly for engagement with certain operating collars, Figs. 4 and 5. The channel 21 has a lower horizontal leg 24 which is integral with a part thereof, and includes a guide member 25 for the lower reach 26 of a drive chain 27, Fig. 5. The upper reach 28 of the drive chain 27 is connected at 29 to the channel member 21, as clearly shown in Fig. 4. The chain 27 is driven from mechanism operated by the rotating knife shaft 4.

GRIPPER CHAIN DRIVE MEANS

The drive means for driving the gripper 5 by the chain 27 comprises an oscillating or vertically reciprocating arm 30, Fig. 6, which is operated directly by the knife shaft 4. The knife shaft 4 has mounted thereon an eccentric 31, Fig. 14, which is arranged in a casing. The eccentric 31, Fig. 14, is surrounded by an eccentric strap 33 having an arm 34 which is pivoted at 35 to a clevis 36. The clevis 36 is pivotally mounted on a rod 37 which is connected to a rigid part of the slicing machine frame. The clevis 36 includes a boss 38 which receives a transverse rod or arm 39, whereby rotation of the knife drive shaft 4 causes the arm or rod 39 to reciprocate in a vertical arc. The reciprocating arm or rod 39 receives a boss 40 which is shiftably adjustable longitudinally on the rod 39. The boss 40, which surrounds the reciprocating arm 39, has a downwardly extending arm 41 to which the bifurcated end 42 of the oscillating arm 30 is pivoted as indicated at 43, Fig. 1. Rotation of the shaft 4, therefore, causes vertical reciprocation or oscillation of the arm 30.

The arm 30, Fig. 14, has its lower end drivingly connected at 44 to a clutch arm 45 of a drive clutch member 46, Fig. 6, which is revolubly but loosely mounted on a longitudinal drive shaft 47. The clutch 46 is such that vertical reciprocation of the oscillating rod 30 will cause the drive clutch 46 to rotate in step-by-step movement about a normally stationary drive shaft 47 upon which the clutch member is mounted. Downward reciprocation of the rod 30 causes driving step-by-step or intermittent rotative motion of the clutch member 46 in one direction but non-driving free rotative movement in its opposite direction. A brake band 48, Fig. 14, surrounds a surface of an annular part 49 of the clutch member 46 to prevent rotation of the clutch member in one direction, but allowing rotation of the clutch member in the other direction. The reciprocating or oscillating rod 30, therefore, has a vertical pumping action with respect to the clutch member 46 to permit rotative movement in short increments of the clutch member 46 about the normally stationary shaft 47. The drive clutch member 46 includes a clutch face 50 which carries spaced circumferentially arranged clutch teeth 51. The particular construction of the oscillating arm 30, and the manner in which it causes intermittent rotative movement of the clutch member 46 and the drive shaft 47 is described and claimed in applicant's copending application, Serial No. 283,804, filed April 23, 1952, now abandoned, for Slicing Machine, and assigned to the present assignee.

The clutch face 50 is adapted to be brought into clutching engagement by a clutch shifter rod 52 which is pivotall mounted in a rigid part of the machine frame, and which may be operated by a shifter arm 53, Fig. 6. The clutch shifter rod 52 operates a yoke 54, Figs. 2 and 6, which engages an intermediate clutch member 55 having spaced clutch teeth 56. The intermediate clutch member 55 is splined to the normally stationary shaft 47, and when the clutch shifter rod 52 is turned to bring the teeth 56 on the intermediate clutch member 55 into engagement with the teeth 51 on the clutch face 50, the intermittent rotative movement of the clutch 46 will be transmitted to the shaft 47. Intermittent rotative movement of the clutch member 46, therefore, will be given to the shaft 47 in accordance with the rotative movement of the clutch 46 because of the pumping action, or reciprocating movement, of the lever arm 30.

The shaft 47, Fig. 6, includes an extension 57 which is arranged in a housing 58. The shaft extension 57 has a worm 59 which engages a worm wheel 60. The worm wheel 60 is mounted on a transverse chain drive shaft 61 which has its opposite ends mounted in suitable bearings in the casing 58.

The shaft 61 has a sprocket wheel (not shown) mounted on one end, and this sprocket engages the sprocket chain 27, Fig. 4, to drive the sprocket chain 27. Therefore, when the teeth 51 and 56 are in engagement, the shaft 47 will be given intermittent rotative movement, which movement is transmitted to the sprocket on the transverse shaft 61, and inasmuch as the sprocket is the driving member for the chain 27, the driving chain 27 will be driven intermittently according to the pumping or reciprocating action of the oscillating arm 30. The teeth 56, when engaged with the teeth 51, therefore, will cause driving movement of the chain 27 to drive the pusher or gripper member 5 toward feeding position, and toward the knife, to convey substance along the feed table 2 to the knife to have slices cut therefrom.

The crux of the present invention is to move the gripper 5 toward feeding action in step-by-step intermittent movement toward the slicing knife automatically and to return the gripper automatically to original loading position.

The gripper 5, Fig. 4, is moved along the feed table 2 by the chain 27 because of the connection between the upper reach 28 of the chain 27 and the sleeve 8 which surrounds the slide rod 10. Thus when the clutch shifter rod is given partial rotation, the yoke 54, Fig. 2, will shift the intermediate clutch element 55 to cause intermittent translation of the chain 27, and thereby move the pusher 5 forwardly in rapid intermittent feeding steps. After the gripper 5 has reached the end of its forward or feeding movement, it is automatically brought to rest by engagement with the forward part 23 of the member 21, Fig. 4, engaging a forward spring bumper stop member 62 which is adjustably fixed to a longitudinal rod 63, Figs. 2 and 4.

The rod 63, Figs. 2 to 5, underlies the feed table 2 and extends from the forward end of the feed table to the rearward end thereof. Thus when the gripper 5 reaches a predetermined forward position close to the knife, the member 23 will strike the spring stop 62 and shift the rod 63 to the left, Fig. 2. One end of the rod 63 is slidably mounted in a rigid part 64 of the machine, Fig. 2, while its other end is arranged between the ends 65, 65 of a yoke 66 and pivotally connected thereto. The engagement of the member 23 with the forward stop collar 62, Fig. 4, will shift the rod 63 to the left, Fig. 2, and swing the rigid arm 67 on the member yoke 66 in a clockwise direction, Fig. 2. This shifting movement of the arm 67, which is attached rigidly to the shifter rod 52, will cause partial rotation of the rod 52 and thus cause disengagement of the teeth 56 on the intermediate clutch member 55 from the teeth 51 on the clutch face 50, of the clutch member 46, Fig. 6. The sliding movement of the rod 63, however, is such that immediately after the teeth 56 and 51 are disengaged, and the shifter rod 52 is given additional rotative movement, the clutch member 55 will be shifted to bring clutch teeth 68, Fig. 6, on the left-hand side of the intermediate clutch member 55 into clutching engagement with the clutch teeth 69, Fig. 6, of a sprocket clutch member 70.

The sprocket clutch 70, Fig. 6, is loosely mounted on the left-hand end of the shaft 47 and continuously rotates thereabout, the sprocket clutch 70 being driven by a sprocket chain 71, over which the sprocket on the knife shaft 4 (not shown) is also trained. The rotative speed of the knife shaft 4, therefore, is transmitted to the sprocket (not shown) and drives the sprocket chain 71. Therefore, the clutch sprocket 70 is rotated in accordance with the rotative speed of the knife shaft 4. When the shifter shaft 52 is operated either manually by the hand shifter 53, or automatically by the rod 63, the teeth 56 of the clutch element 55 will be disengaged from the teeth 51 on the clutch face 50, but the teeth 68 on member 55 will become engaged with the teeth 69 on the member 70. Inasmuch as the intermediate clutch member 55 is splined to the shaft 47, the shaft 47 will be caused to rotate at a very rapid speed in accordance with the rotative speed of the knife shaft 4. However, the disengagement of the teeth on the intermediate clutch 55 from the teeth on both members 46 and 70 (neutral position, Fig. 6) just lets the clutch member 46 idle rotatively about the shaft 47 and there will be no driving action.

The shaft 47 will be caused to rotate rapidly in an opposite or reverse direction when the teeth 68 and 69 are in engagement. This rapid rotation of the shaft 47, Fig. 6, is transmitted to the transverse shaft 61 through the worm wheel 60 and worm 59. The gripper 5, therefore, is returned to its original, or loading, position at a very rapid rate of speed. However, as soon as the gripper 5 has been returned to its original, or loading, position, a second stop collar 72 on the rod 63, Fig. 2, will engage the rear face of the member 23 and shift the rod 63 to the right, Fig. 2, causing the rigid arm 67 on the rod 52 to be shifted in a counter-clockwise direction. This counterclockwise rotation of the shifter rod 52 again gives lateral movement to the intermediate clutch member 55 to again bring the teeth 56 of the member 55 into engagement with the teeth 51 on the clutch face 50 and again move the gripper 5 toward feeding position in a step-by-step movement.

The collars 62 and 72, Figs. 2 to 4, on the rod 63 in effect comprise spring bumpers. Springs 73, 73 are arranged behind the collars 62 and 72, Figs. 2 and 3, so that the engagement with the shifter operating member 23 will be soft and noiseless. Pressure against the collar 62 or 72 will cause one of the springs 73 to compress against an appropriate one of the collars 74, 74, which are each adjustably locked to the rod 63 by means of a set screw 75. Thus, when the member 23 on the slide sleeve 8 engages the collar 62 during the forward movement of the gripper 5, the spring 73 will compress and be forced against the locked adjustable collar 74 to shift the rod 63 in a forward direction. The shifting of the rod 63 in the forward direction will cause the shifter rod 52 to be given a clockwise turn, and thus shift the intermediate clutch member 55 to the left, Fig. 6, causing engagement of the teeth 68 and 69. The gripper 5 will then be caused to return to its original position at a rapid rate of speed. At the conclusion of the rearward movement of the gripper 5, the projection 23 will strike the bumper collar 72 and compress the spring 73 against the locked adjusted collar 74, and shift the rod 63 to the right, Fig. 2. The shiftable movement to the right of the rod 63, Fig. 2, will cause the shifter shaft 52 to rotate in a counterclockwise position and cause the gripper 5 to move in its forward step-by-step feeding travel.

A bell crank 76, Figs. 2 and 7-9, is pivoted to a pin 77 fixed to a rigid part of the slicing machine frame. The upper arm 78 of the bell crank 76 is pivotally connected at 79, to a pin 80 which passes through a bar 81 fixed to a rigid part of the machine frame, Figs. 7-9. A relatively stiff coil spring 82 surrounds the pin 80 and bears against a nut 80' on the end of the pin 80 and against the cross bar 81 to apply spring pressure to the arm 78 of the bell crank 76, Figs. 7-9. The lower arm 83 of the bell crank 76 is provided with an angular projection 84, on its upper side, to cooperate with a square block 85 fixed to the arm 67, whereby the movement of the shifter rod 52 will be maintained in any one of its three positions.

Fig. 7 discloses the relative position of the arm 67 with respect to the bell crank 76 when the clutch member 46 is in engagement with the intermediate clutch member 55, to cause intermittent rotative movement of the shaft 47 to feed the gripper 5 toward the knife. The block 85 then has one of its faces arranged against the inside inclined surface of the inclined member 84 to hold the lever arm 67 in such position because of the urging action of the coil spring 82.

The lever arm 67 will be in the position shown in Fig. 8 when the intermediate clutch element 55 is in the neutral or non-driving position as shown in Fig. 6. Neutral position occurs when the rod 63, Fig. 2, is being shifted from forward feeding position to return feed position and the block 85 then rests on top of the pointed end of the member 84, Fig. 8. Thus, at the end of the forward movement of the gripper 5, the shifter rod 52 will be given a part rotation to move the arm 67 out of the position shown in Fig. 7 and into the position shown in Fig. 8. However, at the conclusion of the forward movement of the shifter rod 63, the collar 62 becomes engaged solidly with the stop collar 74, whereupon the shifter rod 52 will be swung from the position shown in Fig. 8 (neutral position) to the position shown in Fig. 9 (reverse feed).

The arm 67, Fig. 9, during the return movement of the gripper 5, will be rotated a predetermined distance until the outer inclined surface of the pointed end 84 is in engagement with the inside side of the block 84, being maintained in such position by the action of the spring 82. The arm 67 remains in the position shown in Fig. 9 all during the return feed movement of the gripper until it has reached the end of its rearward travel. At the completion of the rearward travel of the gripper 5, the stop member 23 on the sleeve member 8 will engage the collar 72 and compress the spring 73 to shift the rod 63 to the right, Fig. 2, whereupon the arm 67 will swing from the position shown in Fig. 9 to feed position shown in Fig. 7, resting momentarily in the neutral position shown in Fig. 8.

The purpose of the bell crank 76, which is loaded by the spring 82, is to prevent unauthorized shifting or swinging movement of the arm 67 during the cycles of operation. The shifting of the arm 67 by the rod 63 causes intermittent feed of the gripper toward feeding position, and then rapid constant return movement of the gripper. These steps of the gripper are done automatically, but the cycle may be changed at any time by manual operation of the manual shifter arm 53 on the shifter rod 52, Fig. 2.

It is desirable that the impaling prongs 13, positioned at the front face of the gripper, be operated automatically also. The automatic projection and recession of the impaling prongs 13, into and out of the openings 12, is accomplished automatically by means of the roller 18 on the arm 17 engaging the end 86 of a cam bar 87, Figs. 4 and 10-12. At the conclusion of the return movement of the gripper 5, which is also the beginning of the feed movement of the gripper, the roller 18 on the arm 17 will be in the position shown in Figs. 4 and 12 with the roller engaging the forward end of the cam bar 87 and with the impaling prongs or teeth 13 being in receded position. At the commencement of the forward feed movement of the gripper 5, the arm 17 will be swung rearwardly to the right, Fig. 12, to shift a prong roller 14 and thus move the impaling prongs 13 outwardly from the casing to impale the substance. The arm 17, during the feeding movement, will be lying relatively horizontal beneath the cam bar 87, as shown in dotted lines at the left of Fig. 12. The impaling prongs will be in impaling position throughout the entire forward feed movement of the gripper 5, and will remain in this position until the conclusion of the return movement of the gripper. At the end of the return movement of the gripper, it will move from the position shown in dotted lines in Fig. 12 to its normal upright nonimpaling position shown in full lines in that figure. The impaling prongs 13 recede into the casing and release the end piece of the substance as soon as the roller 18 leaves the cam bar 87. Immediately upon the release of the end piece of substance, a new slab of substance, such as bacon, is again pushed against the front face 11 of the gripper 5, whereupon the prongs 13 will again be projected outwardly to grip the end of the substance because the gripper is now moving to feed position and the roller 18 is again under the cam bar 87.

The arm 17 of the gripper 5 is normally held in the upright position by a coil spring 88 (Figs. 10 and 11), which surrounds a shaft 14, and therefore, when the gripper 5 moves forwardly toward feeding position, the arm 17 will be swung downwardly by engagement of the roller 18 under the cam bar 87 against the urging action of the spring 88.

Operation

A slab of bacon is laid on the food table 2, at the right-hand end of the operator's stance, Fig. 1, where the machine is first started and the parts are in neutral position as shown in Fig. 6. The shifter handle 53 may then be operated manually to move the intermediate clutch member 55 into a driving engagement with the clutch member 46 to bring the teeth 56 and 51 into engagement. The gripper 5, therefore, is caused to move forwardly, and the prongs 13 will be caused to project outwardly into impaling engagement with the substance because the arm 17 is being pressed downwardly by the cam bar 87. The intermittent feeding movement of the gripper 5 is relatively rapid as about 1000 slices per minute will be cut by the knife. At the end of the feed movement, the member 23 will engage the collar 62 and shift the rod 63 out of feeding engagement through neutral position, Fig. 8, into return feed position, Fig. 9. The gripper 5 returns to original position rapidly as it is operated by a fast direct drive from the rotating knife shaft 4. As previously mentioned, the intermediate clutch 55, when it is shifted from feeding position, will first pass through neutral position, Fig. 6, before it moves to return position. At the end of the rapid return movement of the gripper 5, the gripper will be at its original loading position with the teeth receding out to release the end piece and be in position to again impale the substance as it moves to forward feed. The cycles, therefore, are continuous, a new slab of bacon being applied at the end of each return movement of the gripper 5.

The length of the feed movement of the gripper and return movement thereof are controlled by the positioning of the collars 62 and 72 on the rod 63. The cycle may be interrupted or changed by the manual operation of the handle member 53, Fig. 6, because it is the position of the shifter shaft 52 which determines the forward, neutral or rearward position of the parts to feed or return the gripper. The feed, or the return, movement may be interrupted at any time by the manual manipulation of the handle member 53 on the shifter shaft 52. Also, the parts may be retained in neutral position for as long a period as is necessary or desirable.

The shaft 47 rotates in one direction during feed, being propelled by the pumping action of the oscillating arm 30. This movement of the shaft 47 drives the shaft 61 which moves the chain to feeding direction. Operation of the intermediate clutch 55 to bring it into engagement with the sprocket clutch 70 rotates the shaft 47 in an opposite direction and therefore reverses the movement of the chain 27 to return the gripper 5 to original loading position.

The cam bar 87, Figs. 1, 4 and 12, is adjustably fastened to the integral back apron 89 of the table 2, by means of screws in the apron engaging longitudinal slots 90 in the cam bar 89 at its ends.

The invention provides a gripper which is automatically operated so as to effect intermittent step-by-step movement of the gripper for feeding and to effect rapid return movement of the gripper to original position.

The subject matter of the invention comprises but few and simple parts and causes positive operation for effectively performing the function intended.

Changes may be made in the form, construction and arrangement of the parts without departing from the spirit of the invention or sacrificing any of its advantages and the right is hereby reserved to make all such changes as fall fairly within the scope of the following claims.

The invention is claimed as follows:

1. In a slicing machine having a food table and a slicing knife, a food pusher mounted for reciprocation along the food table toward and away from said slicing knife, an endless drive member connected to said pusher, drive means coupled to said endless member for selectively incrementally advancing the pusher toward the slicing knife or reversing the movement of the endless member to continually move the pusher away from the slicing knife, said drive means comprising a drive shaft operatively connected to said endless member, a clutching member slidably keyed to said drive shaft, a first member carried on said shaft, means for driving said first member in step-by-step increments in one direction, said first member having a clutch engaging portion, a second member carried on said shaft, means for driving said second member continuously and in a direction opposite from the first member, said second member having a clutch engaging portion, whereby engagement between said clutching member and said first member effects incremental movement of said pusher in one direction and engagement between said clutching member and said second member effects continuous movement of the pusher in the other direction, and control means effecting automatic reversal of the endless member and pusher when the pusher reaches predetermined positions along its path of movement.

2. In a slicing machine having a food table and a slicing knife, a food pusher mounted for reciprocation along the food table toward and away from said slicing knife, an endless drive member connected to said pusher, drive means coupled to said endless member for selectively incrementally advancing the pusher toward the slicing knife or reversing the movement of the endless member to continually move the pusher away from the slicing knife, said drive means comprising a drive shaft operatively connected to said endless member, a clutching member slidably keyed to said drive shaft, a first member carried on said shaft, means for driving said first member in step-by-step increments in one direction, said first member having a clutch engaging portion, a second member carried on said shaft, means for driving said second member continuously and in a direction opposite from the first member, said second member having a clutch engaging portion, whereby engagement between said clutching member and said first member effects incremental movement of said pusher in one direction and engagement between said clutching member and said second member effects continuous movement of the pusher in the other direction, and control means effecting automatic reversal of the endless member and pusher when the pusher reaches predetermined positions along its path of movement, said control means comprising a lug on said pusher, a slidably mounted bar having spaced collars thereon in the path of movement of said lug, and linkage operatively connecting said bar with said clutching member.

3. In a slicing machine having a food table and a knife shaft, a slicing knife on said shaft, a food gripper mounted for reciprocation along the food table toward and away from said slicing knife, said food gripper having coacting gripper shafts and retractable impaling prongs fixed to said shafts, means controllably associated with the gripper to selectively shift the impaling prongs into food engaging position including an arm on one of said gripper shafts and a cam bar on a part of the machine for actuating said arm when the gripper is advancing toward the slicing knife, means to rotate the gripper shafts rotatively in a predetermined direction, an endless chain connected to said gripper, drive means coupled to said endless chain to drive the endless chain in forward and reverse directions, said drive means comprising a normally stationary drive shaft, a revolubly mounted one way drive clutch on said drive shaft, an intermediate clutch on said drive shaft and adapted to be driven by said drive clutch, a clutch shifter lever to shift the intermediate clutch into driving engagement with the clutch driver to drive the drive shaft in one direction, and a sprocket clutch on said drive shaft and driven by said knife shaft to drive the chain in a reverse direction when the clutch shifter lever has shifted the intermediate clutch into engagement with the sprocket clutch and out of engagement with the drive clutch, a slide rod mounted on said frame adjacent the chain, a pair of adjustable collars in spaced relation on said slide rod, and a lug on said gripper arranged to engage said collars during reciprocation thereof, whereby engagement between one of the collars and the lug shifts the slide rod, clutch shifter lever and said intermediate clutch into engagement with said one-way clutch and engagement of the other collar and said lug shifts the parts to cause engagement between the sprocket clutch and the intermediate clutch.

4. In a slicing machine having a food table and a knife shaft, a slicing knife on said shaft, a food gripper mounted for reciprocation along the food table toward and away from said slicing knife, said food gripper having coacting gripper shafts and retractable impaling prongs fixed to said shafts, means controllably associated with the gripper to selectively shift the impaling prongs into food engaging position including an arm on one of said gripper shafts and a cam bar on a part of the machine for actuating said arm when the gripper is advancing toward the slicing knife, means to rotate the gripper shafts rotatively in a predetermined direction, an endless chain connected to said gripper, drive means coupled to said endless chain to drive the endless chain in forward and reverse directions, said drive means comprising a normally stationary drive shaft, a revolubly mounted one way drive clutch on said drive shaft, and intermediate clutch on said drive shaft and adapted to be driven by said drive clutch, a clutch shifter lever to shift the intermediate clutch into driving engagement with the clutch driver to drive the drive shaft in one direction, and a sprocket clutch on said drive shaft and driven by said knife shaft to drive the chain in a reverse direction when the clutch shifter lever has shifted the intermediate clutch into engagement with the sprocket clutch and out of engagement with the drive clutch, a slide rod mounted on said frame adjacent the chain, a pair of adjustable collars in spaced relation on said slide rod, a lug on said gripper arranged to engage said collars during reciprocation thereof, whereby engagement between one of the collars and the lug shifts the slide rod, clutch shifter lever and said intermediate clutch into engagement with said one-way clutch and engagement of the other collar and said lug shifts the parts to cause engagement between the sprocket clutch and the intermediate clutch, and means for resiliently maintaining said clutch shifter lever in a predetermined position including a spring biased bell crank having a pair of angularly related faces thereon, and a block pivotally coupled to said slide rod and engageable with said faces.

References Cited in the file of this patent

UNITED STATES PATENTS

| | | |
|---|---|---|
| 161,903 | Rodgers | Apr. 13, 1875 |
| 1,976,824 | Ahrndt | Oct. 16, 1934 |
| 2,126,421 | Stukart | Aug. 9, 1938 |
| 2,177,470 | Ahrndt | Oct. 24, 1939 |
| 2,415,233 | Brustowsky | Feb. 4, 1947 |
| 2,431,391 | Folk | Nov. 25, 1947 |

FOREIGN PATENTS

| | | |
|---|---|---|
| 370,660 | Great Britain | Apr. 14, 1932 |
| 391,717 | Great Britain | May 4, 1933 |